United States Patent Office 2,709,678
Patented May 31, 1955

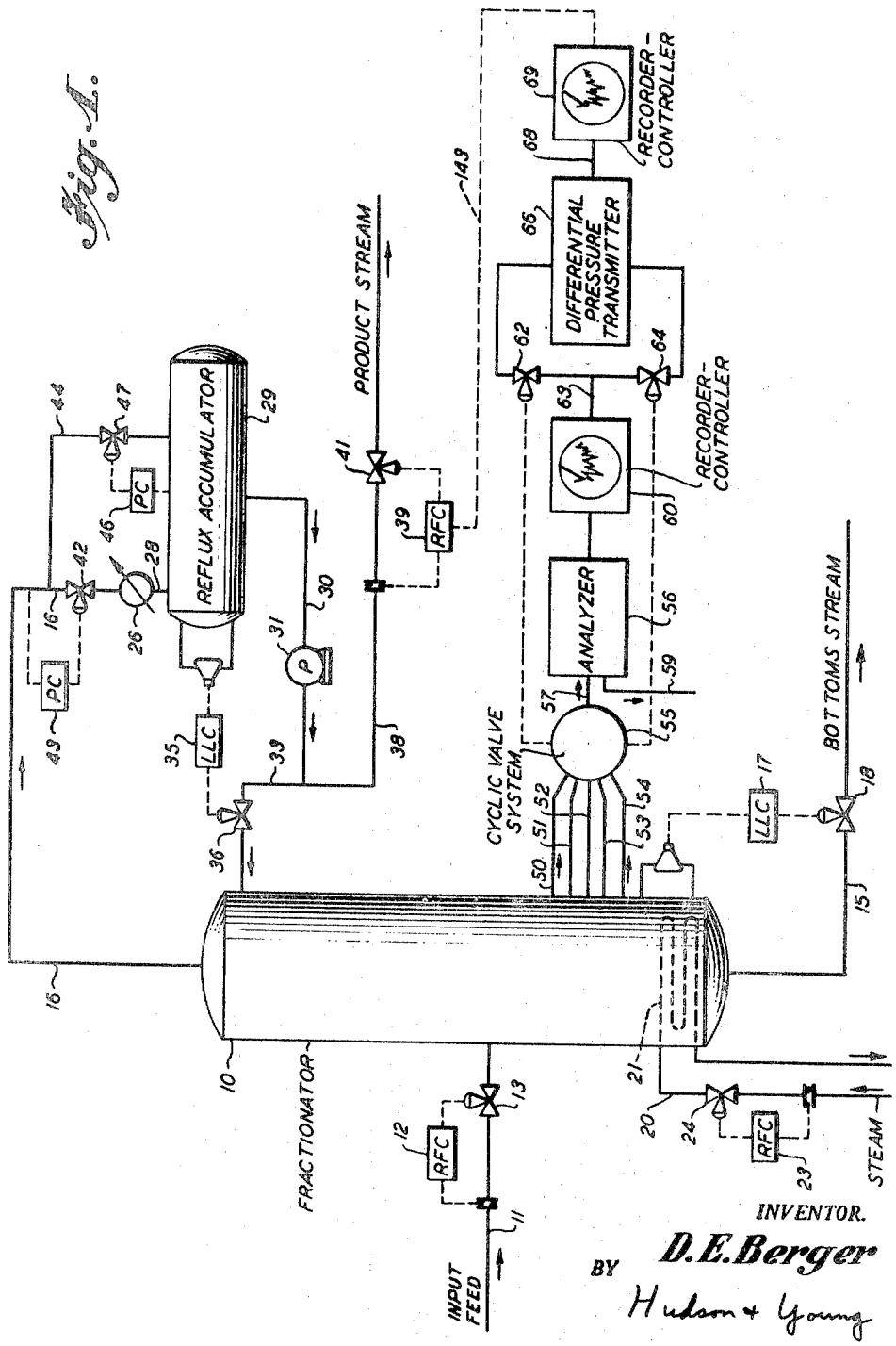

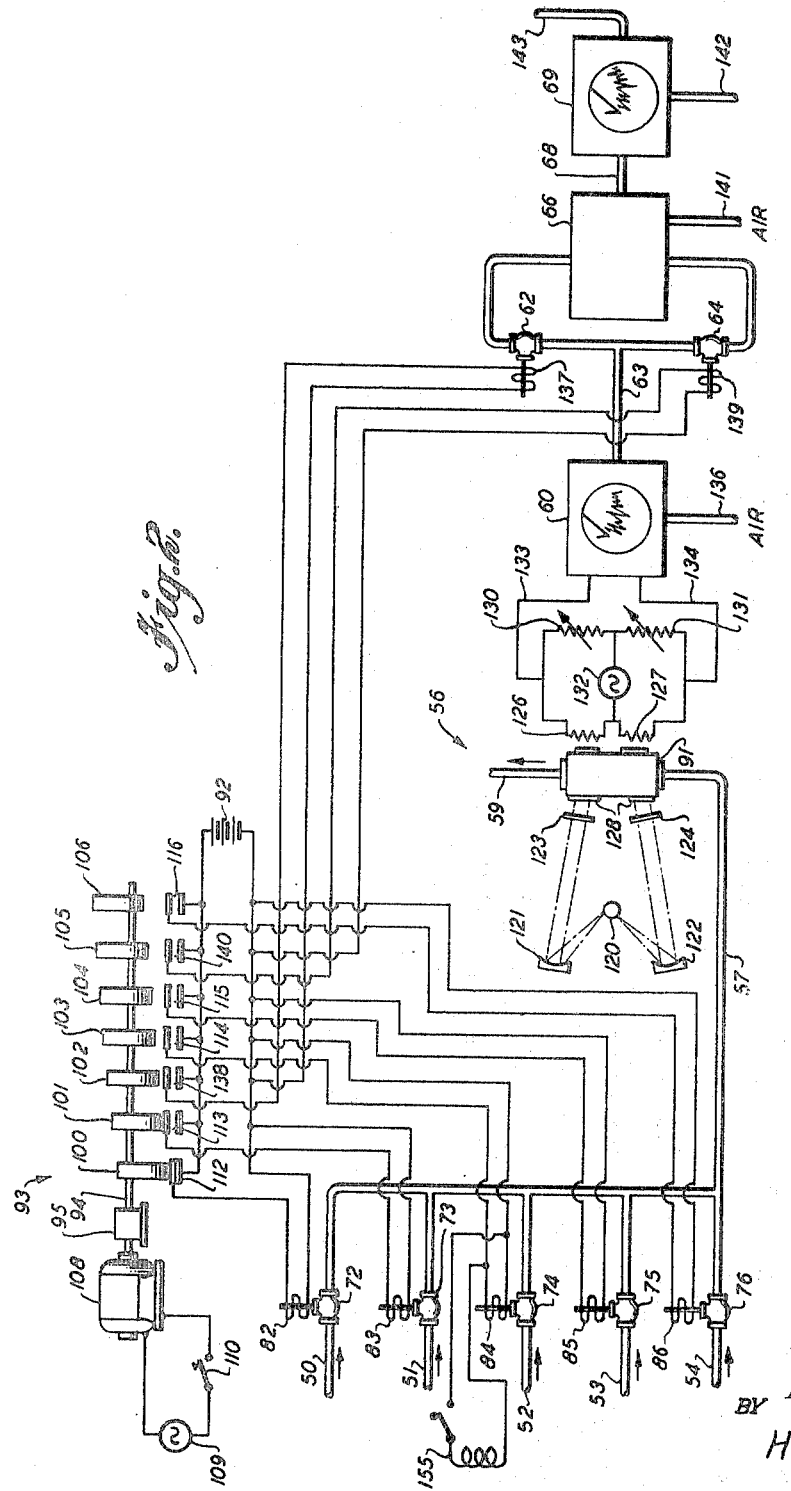

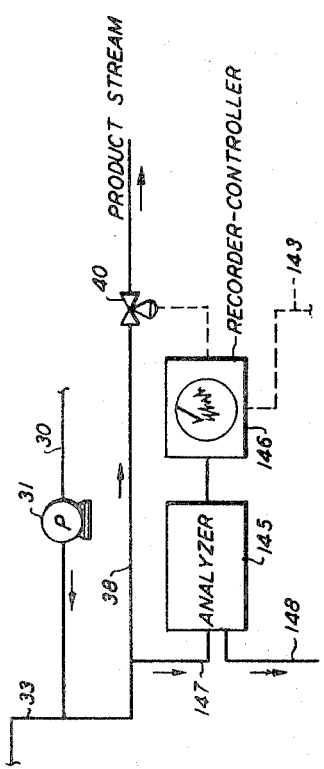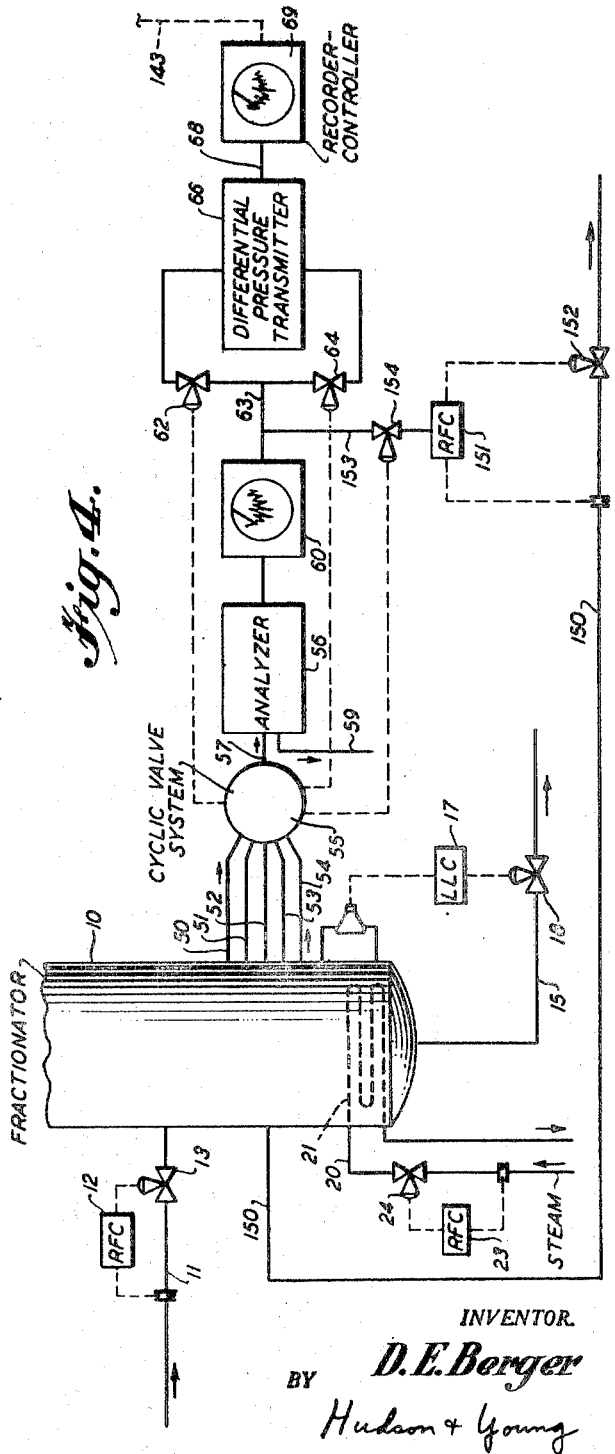

2,709,678

DISTILLATION CONTROL SYSTEM

Donald E. Berger, Bartlesville, Okla., assignor to Phillips Petroleum Company, a corporation of Delaware Application August 26, 1952, Serial No. 306,320

8 Claims. (Cl. 202—160)

This invention relates to the separation of fluid mixtures into their various components. In another aspect it relates to means for detecting the concentration of a component present in a fluid mixture being separated, which component has a volatility at the separating conditions intermediate that of the principal components being separated. In still another aspect it relates to a method of and apparatus for controlling the separation of butadiene-1,3 from butene-2 (both high and low boiling isomers) in the presence of acetylenes, whereby the concentration of acetylenes in the product butadiene stream is maintained at a minimum.

In recent years the production of butadiene has become increasingly important because of its use in the manufacture of synthetic rubber. However, to obtain butadiene having the necessary purity required for successful polymerization into synthetic rubber, means must be provided for separating butadiene from the numerous other hydrocarbons normally formed along with the butadiene by the cracking or dehydrogenation of selected hydrocarbons. Under present synthetic rubber manufacturing conditions it is required that the butadiene purity be not less than approximately 98 mol per cent and further that not more than approximately 0.1 weight per cent total acetylenes be present therein. One particular process which has been found to be valuable in accomplishing this separation is described in United States Patent 2,415,006 issued to K. H. Hachmuth, January 28, 1947. In the system therein described the last step of the separation is one of fractional distillation of a feed stream containing predominantly butadiene, butene-2 and acetylenes into an overhead butadiene product stream and a butene-2, acetylenes bottoms stream.

The problem of separating butadiene from the butenes-2 and acetylenes by fractional distillation to a purity of not less than 98 mol per cent and containing not more than 0.1 weight per cent of total acetylenes has a number of peculiar aspects. Disregarding the acetylenes, the problem is essentially one of separating butadiene from the butenes-2, in particular the trans (low boiling) isomer, even though small amounts of butene-1, isobutylene and normal butane may be present in the feed stream. Because these latter components have nearly the same volatility as butadiene under the separating conditions these latter components are essentially non-separable from butadiene and, accordingly, warrant no further consideration. Through the proper selection of the reflux to feed ratio and the number of trays employed in the fractionating column the desired degree of separation between butadiene and butene-2 can be obtained. This separation is accomplished by ordinary fractionation and suitable automatic control systems are known in the art which can be employed to regulate appropriate column variables to maintain the desired operating conditions.

The acetylenes which normally appear in the butadiene fractionating column feed stream are methyl acetylene, vinyl acetylene and ethyl acetylene. Methyl acetylene is a more volatile component than butadiene and for the most part is removed by the separation process described in the Hachmuth patent prior to the feed stream entry into the last fractionating column. However, some methyl acetylene normally is present in the feed stream supplied to this last fractionating column and as such appears in the butadiene specification product. If it is assumed that the methyl acetylene content is approximately 0.02 weight per cent, then there is allowed a maximum of 0.08 weight per cent total vinyl and ethyl acetylenes. Vinyl and ethyl acetylenes are less volatile than butadiene, but in the presence of butadiene and the butenes under distillation conditions these acetylenes act in a non-ideal fashion, that is their volatility relative to butadiene is not constant but is some complex function of composition. This leads to a peculiar distillation action within the column which results in the concentration gradient of the total acetylenes exhibiting a maximum concentration in the lower region of the column. The maximum concentration reached and the physical location of this maximum are functions of the acetylene concentration in the feed stream and the specification butadiene product purity. It has been found in operation that as the purity of the butadiene product is increased the location of the acetylene concentration maximum is lowered and the concentration thereof decreased. Thus, when difficulty is encountered in meeting the acetylene specification at 98.0% butadiene, the acetylene content specification can be met if the butadiene purity is increased, for example, to 98.5%. The control system of the present invention is based upon this correlation between the butadiene specification purity and the physical position of the acetylene concentration maximum within the column.

Accordingly, it is an object of this invention to provide improved means for controlling the separation of butadiene from butenes-2 and acetylenes.

Another object is to provide apparatus for measuring the concentration in a separation system of a component having a volatility intermediate that of the principal components being separated.

A further object is to provide control apparatus for maintaining steady state operating conditions in a fractional distillation column.

A further object is to provide a system to control the removal of a side stream from a fractionating column, which side stream is removed at the point of maximum concentration of a selected component contained in the side stream.

A still further object is to provide accurate and reliable apparatus for carrying out the above mentioned objects.

Various other objects, advantages and features of this invention should become apparent from the following detailed description taken in conjunction with the accompanying drawing in which:

Figure 1 is a schematic view of a separating column together with analysis and control apparatus associated therewith;

Figure 2 illustrates in greater detail the analysis and control apparatus of Figure 1;

Figure 3 illustrates a second control system for use with the separating column of Figure 1;

Figure 4 is a schematic view of analysis and control apparatus adapted to regulate the removal of a side stream from a separating column.

Figure 5:
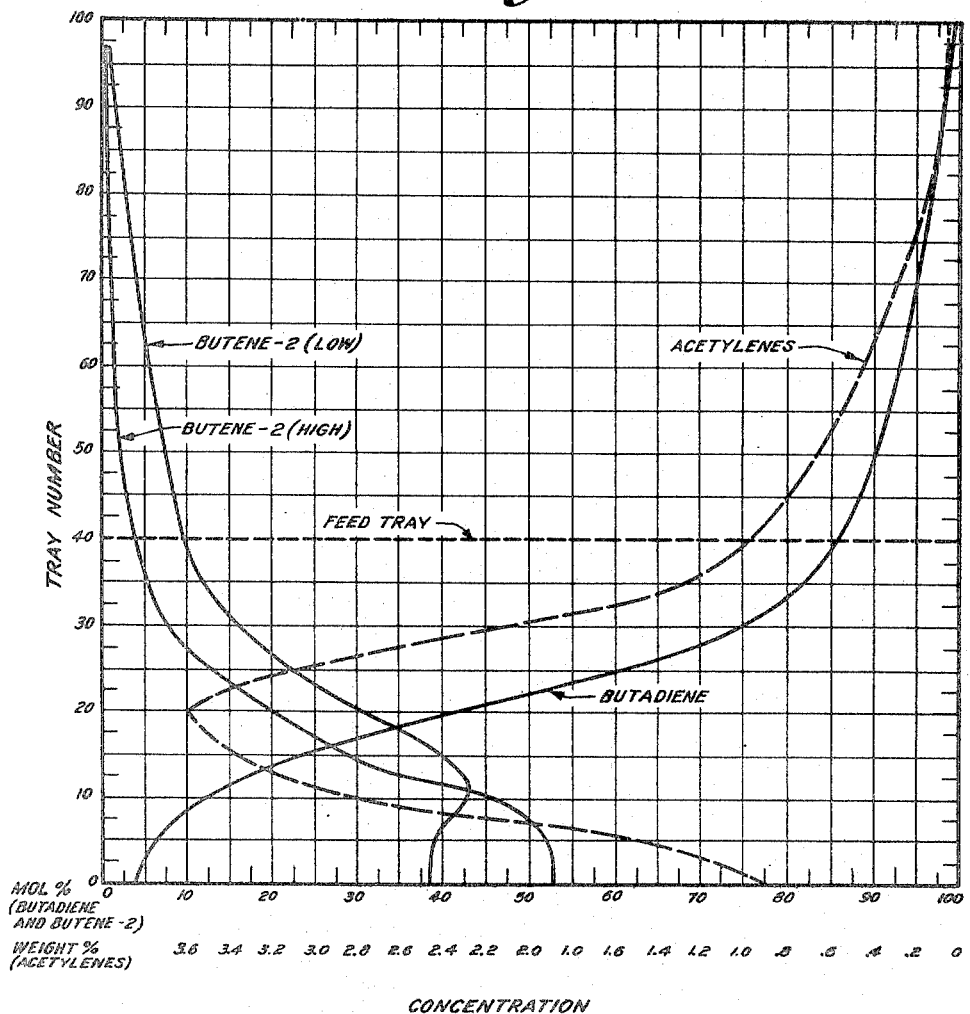
Figure 5 illustrates concentration curves of components being separated in a particular application of this invention.

For purposes of describing the construction and operation of a preferred embodiment of the present invention reference will be made to the above mentioned separation of butadiene from butenes-2 and acetylenes. The control system is adapted to detect and maintain the location of the maximum of the acetylene concentration curve at a desired region within the column. The portion of the acetylene concentration versus tray number of the column curve at which the acetylene concentration is a maximum is hereinafter referred to as the "bulge." To accomplish this result apparatus is provided whereby the acetylene concentrations at selected points above and below the bulge of the curve are compared to detect differences therebetween. If the acetylene concentrations at these two points are the same it is known that the bulge lies between the two points. If the bulge moves up or down the concentrations will change so that either a positive or negative differential exists. The control system of this invention analyzes each stream cyclically and in accordance with the differences in concentration of total acetylenes between the two selected points a suitable process variable is adjusted to maintain the column at desired operating conditions.

Referring now to the drawing in detail and to Figure 1 in particular, there is shown a fractionating column 10 of any suitable design employing contacting means such as perforated plates, bubble decks or the like. The feed mixture to be separated is supplied through an inlet line 11 at a rate controlled by a conventional rate-of-flow controller 12 which adjusts a valve 13 in line 11. This feed mixture is separated within the column into a liquid bottom stream which is withdrawn through a line 15 and into a lower boiling overhead vaporous or gaseous stream which is withdrawn through a line 16. The rate of withdrawal of the bottom stream through line 15 is regulated by a liquid level controller 17 which adjusts a valve 18 in line 15 in accordance with the liquid level in the bottom of column 10. Heat is supplied to the lower region of column 10 through a steam line 20 communicating with coils 21. The amount of heat supplied to column 10 is regulated by a rate-of-flow controller 23 which adjusts a valve 24 in steam line 20.

The vapors and/or gases comprising the relatively light components of the feed mixture which are not retained in the heavier reboiled bottoms fraction are directed from the upper portion of the fractionator through line 16 to a condenser 26 wherein they are partially or completely condensed as desired and wherefrom the resulting condensate is directed through a line 28 to a reflux accumulator 29. The total quantity of distillate collected in accumulator 29 is discharged through a line 30 having pump 31 therein. A portion of the distillate passing through pump 31 is directed through a line 33 back into fractionator column 10 at a rate regulated by a liquid level controller 35 which adjusts a valve 36 in line 33 in accordance with the liquid level in accumulator 29. The remainder of the distillate passing through pump 31 is directed through an overhead product line 38 at a rate maintained by a rate-of-flow controller 39 which adjusts a valve 41 in line 38. In order to maintain the desired operating pressure in column 10 an automatic pressure control valve 42, responsive to a pressure controller 43, is provided in line 16. A line 44 serves to by-pass condenser 26 to compensate for the pressure drop due to the lower vapor pressure of the collected condensate. The rate of flow through line 44 is regulated by a pressure controller 46 which adjusts a valve 47 in line 44 responsive to the pressure in accumulator 29.

For purposes of description, reference is made to a particular separation having a representative analysis of the components in terms of mol per cent approximately as follows:

| Component | Feed Stream | Overhead Product | Bottoms Stream |
|---|---|---|---|
| Butadiene | 92.7 | 98.4 | 3.8 |
| Total acetylenes | 0.21 | 0.10 | 0.88 |
| Butene-2 (High) | 3.0 | 0.4 | 53.2 |
| Butene-2 (Low) | 3.2 | 0.9 | 37.4 |
| Normal butane | 0.3 | 0.1 | 2.2 |
| Butene-1 | 0.7 | 0.2 | 1.1 |

A one hundred tray column is operated at an overhead pressure of approximately 70 pounds per square inch gauge, at a bottom temperature of approximately 146° F. and at an overhead temperature of approximately 124° F. The input feed is supplied at an average rate of approximately 3600 gallons per hour, the reflux is approximately 34,000 gallons per hour, the overhead product stream is withdrawn at a rate of approximately 3300 gallons per hour and the bottom stream is withdrawn at a rate of approximately 300 gallons per hour. The concentration gradients of butadiene, the butenes-2 and total acetylenes within the column are illustrated in Figure 5. From these curves it can be seen that the maximum acetylene concentration occurs at approximately tray No. 20. The acetylene curve shown is a summation of the concentrations of vinyl and ethyl acetylene, primarily vinyl acetylene since its concentration is greater in the column feed stream and since it exhibits a more non-ideal behavior.

In accordance with the present invention, sample streams are removed from the lower portion of column 10 through lines 50, 51, 52, 53 and 54 which communicate with the column at respective trays numbered 28, 24, 20, 16 and 12. The sample streams withdrawn through lines 50–54 periodically pass through a cyclic valve system 55 into an infrared analyzer 56 through a line 57 and then are vented through a line 59. Analyzer 56 is adapted to provide an electrical signal, the magnitude of which is indicative of the concentration of acetylenes present in a sample stream being analyzed. This electrical signal is transmitted to a potentiometer air-operated recorder-controller 60, which provides both a continuous record of the concentration of acetylenes in the sample streams under analysis and an output air pressure representative of such acetylene concentration. Valve system 55 is adapted to open a valve 62 in the output air line 63 from recorder-controller 60 at such time as the sample stream from line 51 is passed into analyzer 56 and also to open a valve 64 in air line 63 at such time as the sample stream from line 53 is passed to analyzer 56. Air line 63 thus communicates with one side of a differential pressure transmitter 66 through valve 62 when the sample stream from line 51 is being analyzed and with a second side of transmitter 66 through valve 64 when the sample stream from line 53 is being analyzed. Transmitter 66 is supplied with air at a reference pressure by a line 141. The output air pressure from transmitter 66, which is a measure of the concentration differential between the acetylenes at trays numbered 24 and 16, is transmitted by a line 68 to a pneumatic recorder-controller 69. The output air pressure from controller 69 is in turn transmitted to rate-of-flow controller 39 such as to reset controller 39 as may be necessary to regulate the rate of withdrawal of the butadiene product stream to maintain the column under steady state operating conditions.

The control system of this invention is illustrated in greater detail in Figure 2. Solenoid operated valves 72, 73, 74, 75 and 76 are positioned in respective lines 50, 51, 52, 53 and 54 to permit passage of sample streams therethrough when energized by respective coils 82, 83, 84, 85 and 86. Lines 50—54 communicate through respective valves 72—76 with a common line 57 which in turn communicates with the inlet of a sample cell 91 forming a part of infrared analyzer 56. Coils 82—86 are energized sequentially from a voltage source 92 by means of a cam switch 93 which comprises a rotatable shaft 94 having a plurality of cams 100, 101, 102, 103, 104, 105 and 106 mounted thereon. Shaft 94 is rotated by synchronous motor 108 through gearing 95. Motor 108 is energized from a voltage source 109 through a switch 110. A circuit path is completed from coils 82—86 to voltage source 92 through respective contact sets 112, 113, 114, 115 and 116 whenever respective cams 100, 101, 103, 104 and 106 are rotated to complete contact therebetween. The cams mounted on shaft 94 are positioned such that for each complete revolution of shaft 94 coils 82—86 are energized sequentially to pass the sample streams through respective lines 50- 54 to sample cell 91.

Analyzer 56 includes a source of infrared radiation such as a heated Nichrome wire shown at 120 from which two beams of radiation are directed against a pair of front surface concave reflectors 121 and 122. The radiation beams are directed by these reflectors through a pair of respective filters 123 and 124 and through a common cell 91 to a pair of radiation sensitive devices 126 and 127 such as bolometers or thermistors. Cell 91 is provided with windows 128 which are transparent to the infrared radiation employed. These windows can be formed of a halide such as silver chloride, calcium fluoride or sodium chloride or of quartz. Filter 123 is formed of quartz which is essentially transparent to the radiation employed and filter 124 is formed from spinel which has characteristic infrared absorption bands approximating those of the acetylenes under analysis. These principal absorption bands occur at approximately 2.9 microns in the infrared spectrum. If desired, filter 124 could be replaced by a cell filled with acetylenes or with any other material having absorption characteristics approximating those of the acetylenes. The beams of radiation incident upon bolometers 126 and 127 produce temperature changes therein which vary the electrical resistance of the bolometers. With the apparatus arranged as described the difference in resistance between the two bolometers indicates the amount or percentage of the aceylenes present in the sample stream passing through cell 91.

Bolometers 126 and 127 are connected in a Wheatstone bridge circuit with balancing resistors 130 and 131. A source of alternating current 132 has one terminal thereof connected to the junction between bolometers 126 and 127 and the other terminal connected to the junction between resistors 130 and 131. Any change in resistance in bolometers 126 and 127 due to differences in intensity of radiation impinging thereon tends to create an unbalance of the bridge circuit, which unbalance is transmitted by leads 133 and 134 to recorder 60. If necessary or desired an amplifier can be inserted between the Wheatstone bridge circuit and controller 60 to amplify the unbalance signal. The infrared analyzer thus far described forms no part of the present invention per se and preferably can be of the type more fully disclosed in U. S. Patent 2,579,825 issued to J. W. Hutchins December 25, 1951.

The unbalance electrical signal fed to controller 60 is recorded thereby to provide a visual indication of changes in concentration of acetylenes in the various streams being analyzed. Controller 60 is a commercially available instrument such as a Brown Air-O-Line potentiometer air operated controller which is described in Catalog No. 8905 of the Brown Instrument Company, Philadelphia, Pennsylvania. Air is supplied to controller 60 by a line 136 at a constant pressure such as 20 pounds per square inch. The input electrical signal fed to controller 60 by leads 133 and 134 serves to vary the output pressure of recorder 60, which output pressure is supplied by line 63 to opposite sides of differential pressure transmitter 66 through respective solenoid operated valves 62 and 64. Valve 62 is opened by a coil 137 which is conected to voltage source 92 through contact sets 138 which in turn are actuated by a cam 102 of switch 93. In similar manner valve 64 is opened by a coil 139 which is connected to voltage source 92 through contact sets 140 which in turn are actuated by a cam 105 of switch 93. Cam 102 and 105 are positioned with respect to respective cams 101 and 104 such that respective valves 62 and 64 are opened at a predetermined time interval following the opening of valves 73 and 75 whereby the output pressure from controller 60 is supplied to one input of transmitter 66 when the sample stream from line 51 is being analyzed, and the output pressure from controller 60 is supplied to a second input of transmitter 66 when the sample stream line 53 is being analyzed. The predetermined time interval is adjusted such that cell 91 is purged of the previous sample stream before valves 62 and 64 are opened. Transmitter 66 is a commercially available instrument such as described in Data Book No. 1000 of the Republic Flowmeter Company, Chicago, Illinois. The differential output pressure from transmitter 66 is supplied by line 68 to recorder-controller 69. Controller 69 also is a commercially available instrument such as the Air-O-Line recorder described in the above mentioned Brown Instrument Company Catalog. Controller 69 can be supplied with an input constant air pressure through a line 142 and in turn supplies an output pressure in line 143 which is proportional to the pressure supplied through line 68. The output pressure in line 143 is employed as an override control on the rate-of-flow controller 39 in Figure 1 as is more fully described hereinafter.

In Figure 3 there is illustrated a modified form of control mechanism which is adapted to regulate the rate of withdrawal of the butadiene product stream through line 38. In this embodiment the rate-of-flow controller 39 is replaced by an analyzer 145. A sample from line 38 is circulated through the analyzer by respective inlet and outlet lines 147 and 148. Analyzer 145 can be an infrared analyzer similar to unit 56 except that the sensitizing filter is replaced by a cell containing butadiene such that the analyzer provides an output electrical signal representative of the concentration of butadiene in the product stream line. The output electrical signal from analyzer 145 is transmitted to a pneumatic recorder-controller 146 which regulates the rate of withdrawal of butadiene through valve 40 to maintain the desired concentration of butadiene in the product stream. In this embodiment the output pressure from controller 69 is supplied to controller 146 by line 143 thereby providing an override control on the butadiene purity as may be required to maintain steady state operating conditions with respect to the acetylene concentration in the column.

In Figure 4 there is shown a system similar to that of Figure 1 but which is further adapted to remove a side stream from column 10 in the region of maximum acetylene concentration thereon. A line 150 communicates with column 10 at the tray from which it is desired to remove the side stream. For the particular system represented by the concentration curves of Figure 5 it is desired to remove the stream from approximately tray No. 20. The rate of withdrawal of the side stream through line 150 normally is regulated by a rate-of-flow controller 151 which adjusts a valve 152 in line 150. An override control also is added to controller 151 to further maintain normal operating conditions within the column. To this end the output air pressure from controller 60 is transmitted by a line 153 and a valve 154 to controller 151. Valve 154 is opened by solenoid coil 155 (Figure 2) which is connected in parallel with coil 84. Thus the output air pressure from controller 60, which is a measure of the acetylene concentration of the sample stream under analysis, is supplied to controller 151 only during that portion of the analysis cycle when the sample stream 52, which also is removed from tray No. 20 in column 10, is transmitted to analyzer 56.

The operation of the control system of this invention should readily become apparent to those skilled in the art. In the example of Figure 1, disregarding the acetylene aspect of the problem, the control system is adapted to provide a butadiene product stream of desired purity, for example 98.0 mol per cent. To this end the rate of withdrawal of the product stream through line 38 is fixed at a predetermined value. The reflux rate is adjusted by liquid level controller 35 to maintain a constant level in reflux accumulator 29. By this means the column is kept in heat balance, that is, if a change in reflux rate is desired, the steam rate must be changed and the reflux rate then changes to bring about a new heat balance. In this manner the required reflux ratio is controlled. If the acetylenes should tend to build up in the column so as to cause an upward shift in the bulge of the acetylene curve, a positive differential will exist between the acetylene concentration of streams 51 and 53. This results in an output air pressure being transmitted by controller 69 to controller 39 which resets controller 39 to reduce the rate of product stream withdrawal, thereby increasing the reflux through line 33 to provide a product stream of higher butadiene purity. If the acetylene bulge tends to move down in column 10, the reverse is true with the product stream withdrawal rate being increased. Of course a limit must be set on controller 39 such that the butadiene purity does not fall below the minimum specification.

The operation of the modification shown in Figure 3 is essentially the same as that of the system of Figure 1. Analyzer 145 measures directly the purity of the butadiene product stream and regulates the withdrawal rate as required to maintain the desired purity. This regulation is accomplished by controller 146 which is reset by controller 69 responsive to the acetylene concentration differential. The override action of controller 69 is the same as that described with reference to Figure 1.

The side stream removal control of Figure 4 operates in the same manner as the systems of Figures 1 and 3 to maintain steady state column conditions. The effect of this control is to maintain the peak of the acetylene bulge at tray No. 20 from which the side stream is withdrawn through line 150. The rate of withdrawal normally is maintained at a preselected value by rate-of-flow controller 151. The rate at which this side stream can be removed without resulting in an upset of steady state operation is determined in part by the magnitude of the acetylene concentration curve in the column, that is, the more acetylene present the greater the permissible side stream withdrawal rate. Thus, the air pressure supplied to controller 151 through line 153, which pressure is representative of the acetylene concentration at tray No. 20, overrides controller 151 to increase or decrease the withdrawal rate within selected limits.

While this invention has been described in conjunction with preferred embodiments thereof, it is to be understood that this description is illustrative only and that the invention is not limited thereby. In general this invention may be applied to any separation in which the feed contains a component whose volatility at the distillation conditions is intermediate that of the light key component and that of the heavy key component. Thus, in the separation of a mixture of $C_5$ olefins and paraffins in which isopentane (boiling point 82.14° F.) is the light key component and normal pentane (boiling point 96.93° F.) is the heavy key component, both pentene-1 (boiling point 85.95° F.) and 2-methyl butene-1 (boiling point 87.98° F.) may exhibit maxima at some intermediate point in the column. Similarly, in the furfural extractive distillation of normal butane and the butenes-2, a maximum is exhibited in the concentration of low boiling butene-2. In this latter example normal butane is the light key component and butene-2 (high boiling) is the heavy key component. In the example of the $C_5$'s mentioned above, normal volatilities are involved; in the example of the $C_4$'s the volatilities are changed in varying degrees by the presence of furfural; and in the example of vinyl acetylene in the butadiene column a non-ideal component is present.

It further should be observed that the particular control apparatus herein described can be modified in many respects as those skilled in the art will readily understand. It is, accordingly, not intended that this invention be limited to the particular control apparatus described. For purposes of simplicity various auxiliary equipment such as pumps necessary to maintain flow through the various lines has been omitted from the drawing.

What is claimed is:

1. In a separation system including a fractionator column having an input feed line, an overhead product line and a bottom product line; apparatus to control the separation of an input feed mixture containing a first component having a volatility at the separation conditions intermediate that of the principal components being separated, comprising, a plurality of sample stream lines communicating with selected spaced regions of said column, an analyzer adapted to measure the concentration of said first component in sample streams passed thereto, a valve system to sequentially pass samples through said sample stream lines to said analyzer, and control means actuated by the output signal from said analyzer to regulate a column variable to maintain the concentration of said first component within predetermined limits in one of said product lines.

2. In a separation system including a fractionator column having an input feed line, an overhead product line and a bottom product line; apparatus to control the separation of an input feed mixture containing a first component having a volatility at the separation conditions intermediate that of the principal components being separated, comprising, a plurality of sample stream lines communicating with selected spaced regions of said column on both sides of the region of maximum concentration of said first component in said column, an analyzer adapted to measure the concentration of said first component in sample streams passed thereto, a valve system to sequentially pass samples through said sample stream lines to said analyzer, means to compare the differential concentration of said first component between sample streams removed through two of said sample stream lines communicating with opposite sides of the region of maximum concentration of said first component in said column, and control means responsive to said differential comparing means to regulate a column variable to maintain said differential concentration constant at a predetermined value.

3. In a separation system including a fractionator column having an input feed line, an overhead product line and a bottom product line; apparatus to control the separation of an input feed mixture containing a first component having a volatility at the separation conditions intermediate that of the principal components being separated, comprising, a plurality of sample stream lines communicating with selected spaced regions of said column on both sides of the region of maximum concentration of said first component in said column, an analyzer adapted to measure the concentration of said first component in sample streams passed thereto, a valve system to sequentially pass samples through said sample stream lines to said analyzer, means to compare the differential concentration of said first component between sample streams removed through two of said sample stream lines communicating with opposite sides of the region of maximum concentration of said first component in said column, and means responsive to said differential concentration comparing means to regulate the rate of withdrawal of the stream through said overhead product line to maintain said differential concentration constant at a predetermined value.

4. In a separation system including a fractionator column having an input feed line, an overhead product line and a bottom product line; apparatus to control the separation of an input feed mixture containing a first component having a volatility at the separation conditions intermediate that of the principal components being separated, comprising, a plurality of sample stream lines communicating with selected spaced regions of said column on both sides of the region of maximum concentration of said first component in said column, an analyzer adapted to measure the concentration of said first component in sample streams passed thereto, a valve system to sequentially pass samples through said sample stream lines to said analyzer, means for establishing pneumatic pressures representative of the readings of said analyzer, a differential pressure transmitter, means for applying said pneumatic pressures to opposite input sides of said transmitter representing respective concentrations of said first component at regions on opposite sides of said maximum concentration region in said column, and means responsive to the differential output pressure of said transmitter to regulate the rate of withdrawal of the stream through said overhead product line to maintain said differential concentration constant at a predetermined value.

5. In a separation system including a fractionator column, a feed line communicating with said column, a bottom product line communicating with said column, an overhead line communicating with said column, and means for returning a predetermined portion of the material taken from said overhead line to said column as reflux; apparatus to control the separation of a fluid mixture comprising butadiene, butene-2 (both high and low boiling isomers) and acetylenes into an overhead stream comprising a major part of butadiene and a bottom stream comprising a major part of butene-2 (both high and low boiling isomers), comprising a plurality of sample stream lines communicating with selected spaced regions in said column on both sides of the region of a maximum concentration of acetylenes in said column, an analyzer adapted to measure the concentration of acetylenes in sample streams passed thereto, a valve system to sequentially pass samples through said sample stream lines to said analyzer, means to compare the differential concentration of acetylenes between sample streams removed through two of said sample stream lines communicating with opposite sides of the region of maximum concentration of acetylenes in said column, and means responsive to said differential concentration to regulate the reflux ratio of said column to maintain said differential concentration constant at a predetermined value.

6. The combination in accordance with claim 5 wherein said analyzer comprises a cell through which said samples being analyzed are circulated, a source of infrared radation, means for directing a pair of beams of radiation from said source through said cell, a spinel filter disposed in one of said beams, first and second radiation sensitive electrical elements disposed in said respective beams, and circuit means including said elements to provide an output signal representative of differences in intensity of radiation impinging upon said elements.

7. In a separation system including a fractionator column, a feed line communicating with said column, a bottom product line communicating with said column, an overhead line communicating with said column, means for returning a predetermined portion of the material taken from said overhead line to said column as reflux, and a side stream withdrawal line communicating with said column; apparatus to control the separation of a fluid mixture comprising butadiene, butene-2 (both high and low boiling isomers) and acetylenes into an overhead stream comprising a major part of butadiene, a bottom stream comprising a major part of butene-2 (both high and low boiling isomers), and a side stream containing the maximum concentration of acetylene present in any region of said column, a plurality of sample stream lines communicating with selected spaced regions in said column on both sides of and at the region of a maximum concentration of acetylenes in said column, an analyzer adapted to measure the concentration of acetylenes in sample streams passed thereto, a valve system to sequentially pass samples through said sample stream lines to said analyzer, means to compare the differential concentration of acetylenes between sample streams removed through two of said sample stream lines communicating with opposite sides of the region of maximum concentration of acetylenes in said column, means responsive to said differential concentration to regulate the reflux ratio of said column to maintain said differential concentration constant at a predetermined value, and means to regulate the rate of withdrawal of said side stream responsive to the concentration of acetylenes at said region of maximum concentration whereby said side stream withdrawal rate is proportional to the measured concentration of acetylenes at said maximum concentration region.

8. The combination in accordance with claim 7 wherein said analyzer comprises a cell through which said samples being analyzed are circulated, a source of infrared radiation, means for directing a pair of beams of radiation from said source through said cell, a spinel filter disposed in one of said beams, first and second radiation sensitive electrical elements disposed in said respective beams, and circuit means including said elements to provide an output signal representative of differences in intensity of radiation impinging upon said elements.

References Cited in the file of this patent

UNITED STATES PATENTS

| | | |
|---|---|---|
| 2,386,778 | Claffey | Oct. 16, 1945 |
| 2,386,830 | Wright | Oct. 16, 1945 |
| 2,434,923 | Hachmuth | Jan. 27, 1948 |
| 2,462,995 | Ritzman | Mar. 1, 1949 |
| 2,618,667 | Hanson | Nov. 18, 1952 |